United States Patent
Plogmann et al.

[11] Patent Number: 6,160,075
[45] Date of Patent: Dec. 12, 2000

[54] TWO-COMPONENT (PU) POLYURETHANE COATING COMPOSITION WITH HIGH ENVIRONMENTAL AND MECHANICAL RESISTANCE

[75] Inventors: Friedrich Plogmann, Castrop-Rauxel; Rainer Lomoelder, Muenster; Stephan Kohlstruk, Recklinghausen, all of Germany

[73] Assignee: Huels Aktiengesellschaft, Marl, Germany

[21] Appl. No.: 09/199,490

[22] Filed: Nov. 25, 1998

[30] Foreign Application Priority Data

Nov. 28, 1997 [DE] Germany .......................... 197 526 91

[51] Int. Cl.⁷ ..................... C09D 175/04; C09D 175/06; C08G 18/73; C08G 18/75; C08G 18/79
[52] U.S. Cl. ................................. 528/67; 528/59; 528/60; 528/65; 528/66; 528/73; 528/80
[58] Field of Search ................................. 528/67, 73, 80, 528/59, 65, 66, 60

[56] References Cited

U.S. PATENT DOCUMENTS

| | | | |
|---|---|---|---|
| 4,518,740 | 5/1985 | Disteldorf et al. ...................... | 524/783 |
| 4,772,665 | 9/1988 | Disteldorf et al. ...................... | 525/123 |

*Primary Examiner*—Rabon Sergent
*Attorney, Agent, or Firm*—Oblon, Spivak, McClelland, Maier & Neustadt, P.C.

[57] ABSTRACT

A two-component polyurethane coating composition essentially comprising (A) a polyols component, (B) a polyisocyanate component, wherein the polyisocyanate component (B) comprises at least 30% by weight of a polyisocyanate based on 2-methylpentane-1,5-diisocyanate and a polyisocyanate based on isophorone diisocyanate, the sum of the two polyisocyanates being 100% by weight.

19 Claims, No Drawings

TWO-COMPONENT (PU) POLYURETHANE COATING COMPOSITION WITH HIGH ENVIRONMENTAL AND MECHANICAL RESISTANCE

BACKGROUND OF THE INVENTION

1. Field of the Invention

The present invention relates to two-component polyurethane coating compositions which are highly resistant to environmental influences and to mechanical stresses.

2. Discussion of the Related Art

Two-component polyurethane (2C-PU) coatings based on aliphatic and cycloaliphatic polyisocyanates are known for their high weathering stability and resistance to yellowing and to chemicals. Consequently, one of their use is in the field of automotive OEM finishing, as topcoats or clear-coats (W. Wieczorrek in: Stoye/Freitag, Lackharze *Resins for Coatings*, p. 215 ff., C. Hanser Verlag, 1996). They are particularly notable for high resistance to environmental influences such as acid rain or bird droppings, in relation to conventional topcoats (R. Ryntz, Paint & Coatings Industry, March 1997, p. 36). The resistance to environmental influences of 2C-PU coatings based on polyisocyanates of hexamethylene diisocyanate (HDI) has been significantly improved by using a mixture of polyisocyanates of HDI and of isophorone diisocyanate (IPDI) (WO 93/05090).

Relatively high proportions of IPDI polyisocyanate in the polyisocyanate mixture leads, owing to the increase in the glass transition temperature, to a further improvement in the resistance to environmental influences, but also impairs the resistance to mechanical stresses, such as, for example, the scratch resistance or wash-line resistance (Industrie Lackierbetrieb 61 (1993), 30).

Against the demand for continually increasing quality requirements imposed on the OEM finishing of automobiles, the aim is for a further improvement in the required properties.

Accordingly, an object of the present invention is to find a 2C-PU coating composition featuring improved resistance to environmental influences without impairment the mechanical resistance properties, especially the scratch resistance or wash-line resistance. This object has been achieved by the 2C-PU coating compositions of the invention.

SUMMARY OF THE INVENTION

The invention provides two-component polyurethane coating compositions comprising:

A) a polyol component, and

B) a polyisocyanate component, wherein the polyisocyanate component (B) comprises at least 30% by weight of a polyisocyanate based on 2-methylpentane-1,5-diisocyanate and a polyisocyanate based on isophorone diisocyanate, the sum of the two polyisocyanates being 100% by weight.

DESCRIPTION OF THE PREFERRED EMBODIMENTS

Polyisocyanates based on 2-methylpentane-1,5-diisocyanate (MPDI) are known (DE 31 51 855, DE 31 51 853, DE 32 27 779). DE 31 51 854 describes the thermal stability at 240° C.—a stability improved over that of other polyisocyanates—of polyurethane coatings based on MPDI isocyanurate. A comparison of the chemical s resistance of PU coatings based on MPDI or HDI isocyanurate gave no indication of a difference in the level of resistance.

The achievement of the object was surprising insofar as a marked improvement in terms of the resistance to environmental influences and good resistance to mechanical stresses relative to corresponding 2C-PU systems based on HDI polyisocyanates was unexpected, owing to the fact that the diisocyanates used to prepare the polyisocyanates, HDI and MPDI, respectively, are very similar structurally (DE 31 51 854).

The polyisocyanate component (B) comprises at least 30% by weight of a polyisocyanate based on 2-methylpentane-1,5-diisocyanate and a polyisocyanate based on isophorone diisocyanate.

MPDI-based polyisocyanates which can be employed are biuret-, uretdione- and/or isocyanurate-functional polyisocyanates (DE 31 51 855, DE 31 51 853, DE 32 27 779), including those in allophanate-modified form, as described in principle in EP 535 483. The average functionality preferably is between 2.3 to 5. In a preferred embodiment, distillative separation is used to provide for the use of polyisocyanates having a residual monomer content <0.5% by weight. Particular preference is given to polyisocyanates that contain isocyanurate groups.

As IPDI-based polyisocyanates it is preferred to employ isocyanurate-functional polyisocyanates (U.S. Pat. No. 4,454,317), including those in allophanate-modified form, as described in principle in EP 535 483.

The average functionality of the IPDI polyisocyanate preferably is between 2.3 to 4. In a preferred embodiment, distillative separation provides for the use of polyisocyanates having a residual monomer content <0.5% by weight. It is particularly preferred to employ polyisocyanates that contain isocyanurate groups.

In addition to a physical mixture of isocyanurate-based polyisocyanates of the pure diisocyanates it is possible, in a further embodiment, to employ isocyanurate-based polyisocyanates obtained by catalytic trimerization of diisocyanate mixtures of MPDI and IPDI, as described in principle in DE 30 33 860.

Compounds suitable as polyol component (A) are hydroxyl-containing (meth)acrylic copolymers, alone or in combination with hydroxyl-containing saturated polyester resins and/or urethane- and ester-functional polyols.

As hydroxyl-containing (meth)acrylic copolymers it is possible to use resins having a monomer composition as described, for example, in WO 93/15849 or else in DE 195 29 124. In this context, the acid number of the (meth)acrylic copolymer that is to be established by proportionate use of (meth)acrylic acid as monomer is 0–15, preferably 3–10. The number-average molecular weight (determined by gel permeation chromatography against a polystyrene standard) of the (meth)acrylic copolymer is preferably 2,000–20,000, the glass transition temperature is preferably from −10 to +60° C. The hydroxyl number of the (meth)acrylic copolymers to be used in accordance with the invention that is to be established by proportionate use of hydroxyalkyl (meth)acrylates, is preferably 70–250 mg of KOH/g, with particular preference 90–190 mg of KOH/g.

Polyesterpolyols that are suitable, in accordance with the invention, include resins having a monomer composition comprising di- and polycarboxylic acids and di- and polyols, as are described, for example, in Stoye/Freitag, Lackharze (Resins for Coatings), C. Hanser Verlag, 1996, p. 49, or else in WO 93/15849. Also employed as polyesterpolyols are polyaddition products of caprolactone with low molecular mass diols and triols, as are obtainable, for example, under the designation TONE (Union Carbide Corp.) or CAPA (Solvey/Interox). The mathematically determined weight average molecular weight is preferably 500–5000, with particular preference 800–3000, and an average functionality of 2.0 to 4.0, preferably 2.0 to 3.5.

Suitable urethane- and ester-functional polyols that are to be used in accordance with the invention are in principle those described in EP 140 186. Preference is given to urethane- and ester-functional polyols prepared using trimethylhexamethylene diisocyanate (TMDI), IPDI or MPDI.

The molecular weight is preferably 500–2000, the average functionality is preferably 2.0 to 3.5.

The 2C-PU coating composition of the invention generally includes auxiliaries and solvents that are known in coatings technology, such as stabilizers, including light stabilizers, catalysts, leveling agents or rheological auxiliaries, such as sag control agents, microgels or pyrogenic silica in typical concentrations.

Particularly suitable catalysts are those which have established themselves in the field of 2C-PU technology, examples being organic Sn(IV), Sn(II) and Bi compounds or else tertiary amines.

The auxiliaries are normally incorporated into component (A).

If necessary, it is also possible to incorporate into component (A) organic or inorganic color pigments that are common in coatings technology.

As solvents for diluting the coating composition of the invention, it is preferred to use aromatic and/or ester-functional, non-protic solvents.

Before being processed, components (A) and (B) are intimately mixed. The mixing ratio of the two components is given by the hydroxyl number of component (A) and the isocyanate content of component (B), taking into account the desired stoichiometry expressed as a ratio OH:NCO. In accordance with the invention the preferred ratio OH:NCO is from 1:0.8 to 1:1.5, with particular preference from 1:0.9 to 1:1.3.

The coating composition of the invention can be applied by known techniques, such as spraying, dipping, rolling or knife coating. In this context, the substrate to be coated may have already been provided with further layers of coating material. The coating composition of the invention is particularly suitable as a clear-coat, in which case it can be applied to a base-coat film by the wet-on-wet process, after which the two coating films are cured together.

Cure of the coating composition of the invention can be accelerated by increasing the temperature. It takes place preferably in the range from 20° C. to 200° C.

Having generally described this invention, a further understanding can be obtained by reference to certain specific examples which are provided herein for purposes of illustration only and are not intended to be limiting unless otherwise specified.

The following Examples are also recited in the priority document, German patent application 197 526 91.8 filed Nov. 28, 1997, which is incorporated herein by reference in its entirety.

EXAMPLES

Example 1

An isocyanurate-based polyisocyanate based on MPDI was obtained, in accordance with DE 31 51 855, by catalytic trimerization of MPDI and subsequent removal of residual monomer by thin-film distillation. The highly viscous product was dissolved to a strength of 90% by weight in butyl acetate. The solution had the following characteristic data: Viscosity (23° C.): 3500 mP·as; NCO content: 19.4%; monomeric MPDI: 0.3% by weight.

Examples 2–3 and Comparative Examples 4–5.

The Comparative Example 4 (compared with Example 2 in accordance with the present invention) and 5 (compared with Example 3 in accordance with the present invention) document the prior art using polyisocyanate mixtures of HDI polyisocyanate (aliphatic) and IPDI polyisocyanate (cycloaliphatic). Examples 2 and 3 comprise coating compositions of the invention using the polyisocyanate mixtures of the invention comprising MPDI polyisocyanate (aliphatic, Example 1) and IPDI polyisocyanate (cycloaliphatic).

The 2C-PU coating compositions were formulated using MACRYNAL SM 510 N (Hoechst-Vianova Resins) as hydroxyl-containing (meth)acrylic copolymer. Characteristic data of the resin: OH number 150 mg of KOH/g; Tg: +30° C. Transparent 2C-PU coating compositions (clear-coats) are formulated in accordance with the proportions indicated in Table 1; the OH:NCO stoichiometry was 1:1 in every case. The viscosity of the clear-coats, determined as the flow time from a DIN 4 cup at 20° C., was about 20 seconds. To test the resistance to environmental influences and to mechanical stress the clear-coats were applied by spraying wet-on-wet over a metallic base-coat from Herberts (STANDOX VWL 97A Diamantsilber), which had been applied likewise by spraying and flashed off for 5–10 minutes at the ambient temperature. The cure was affected after a flash-off time of 5 minutes at room temperature and 30 minutes at 130° C. The dry-film coat thickness of the clear-coats was in each case about 30 μm, that of the overall system about 45 μm.

To determine the general mechanical characteristics of the cured 2C-PU coatings, clear-coats having a dry-film coat thickness of about 35 μm were applied to phosphated steel panel (Bonder 26) and cured at 130° C. for 30 minutes.

TABLE 1

Parts by weight (%) of the formulation constituents of the clear-coats

|  | Example 2 | Example 3 | Example 4 (comparative) | Example 5 (comparative) |
|---|---|---|---|---|
| Weight proportion of the aliphatic/cycloaliphatic polyisocyanates (solid resins) | 7/3 | 1/1 | 7/3 | 1/1 |
| MPDI polyisocyanate (Example 1) | 12.0 | 9.0 |  |  |
| HDI polyisocyanate (isocyanurate-based aliphatic polyisocyanate (DESMODUR N 3390, Bayer AG (90% strength)) |  |  | 11.8 | 9.2 |
| IPDI polyisocyanate (isocyanurate-based, cycloaliphatic polyisocyanate) (VESTANAT T 1890 L, Hüls AG (70% strength)) | 6.6 | 11.5 | 6.6 | 11.8 |
| MACRYNAL SM 510 N (Hoechst-Vianova Resins) | 46.5 | 46.4 | 46.3 | 47.3 |

TABLE 1-continued

Parts by weight (%) of the formulation constituents of the clear-coats

|  | Example 2 | Example 3 | Example 4 (comparative) | Example 5 (comparative) |
|---|---|---|---|---|
| Ca octoate (4% Ca) (Borchers) | 0.8 | 0.8 | 0.8 | 0.8 |
| DBTL (1% strength in butyl acetate) | 0.43 | 0.66 | 0.43 | 0.65 |
| TINUVIN 292 (CIBA-GEIGY), 8% strength in xylene | 2.8 | 2.8 | 2.7 | 2.8 |
| TINUVIN 900 (CIBA-GEIGY), 8% strength in xylene | 2.8 | 2.8 | 2.7 | 2.8 |
| DBE (Dibasic Ester) (Du Pont) | 4.6 | 2.6 | 4.5 | 2.6 |
| Fluorad FC 430 (3M), 10% strength in butyl acetate | 2.0 | 2.0 | 2.0 | 1.9 |
| Butyl acetate | 10.8 | 10.8 | 11.1 | 10.1 |
| Xylene | 10.7 | 10.7 | 11.1 | 10.1 |

TABLE 2

Mechanical characteristics of the cured clear-coat films

|  | Example 2 | Example 3 | Example 4 (comparative) | Example 5 (comparative) |
|---|---|---|---|---|
| Dry-filmcoat thickness [µm] | 35 | 30 | 33 | 40 |
| Buchholz impression hardness (DIN 53153) | 125 | 143 | 111 | 111 |
| Pendulum hardness (König) [s] (DIN 53157) | 192 | 197 | 194 | 201 |
| Erichsen indentation [mm] (DIN 53156) | 5.5 | 4.0 | 7.0 | 6.5 |
| Resistance to super-grade gasoline* | 1 | 1 | 1 | 1 |
| Ball impact test (Gardner), direct [in lbs] | 60 | 40 | >80 | 30 |

*30 second exposure of the cured coating film to super-grade gasoline followed by visual assessment of the resistance: 1: very good, 2; good, 3 average, 4: poor, 5: very poor The resistances of the cured clear-coats to environmental influences were simulated by chemical reagents (20% strength sulfuric acid (resistance to acid rain)) and a 50% dispersion of pancreatin (bird droppings resistance).

Drops (about 0.25 ml) of the reagents were applied from a distance of about 2 cm onto panels coated with a two-coat system (clear-coat over metallic base-coat) and the panels were subjected to a linear temperature gradient of 35–80° C. in a temperature gradient oven (BYK-Gardner) for 30 minutes.

Subsequently, the panels were washed off with water and assessed after 24 hours. Assessment of the acid resistance was conducted using the regions of a first discernible attack of the clear-coat and those of severe destruction, including attack of the base-coat. As the measure of the pancreatin resistance the parameter indicated was the temperature at which visible marks were discernible in the clear-coat.

The resistance to mechanical stresses was investigated in a scratch test on two coat paint systems on phosphated steel panels (Bonder 26): the coated panels are laid horizontally in a trough appropriate for the dimensions of the panel, and are covered with 100 ml of a 0.1% suspension of a scratch medium (Leneta Standardized Scrab Medium, Leneta Co., Ho-Ho-Kus, N.J., USA). A cotton pad with an area of about 1.5 cm$^2$ is then guided in double strokes over the entire length of the panel under a weight of about 1 kg. After 150 double strokes the panel is removed, washed off with water and dried at ambient temperature. After 24 hours, the gloss of the coating is measured at various points of the test region, from angles of 20° and 60°. The average values are employed. The loss of gloss, as a measure of the scratch resistance of a coating, is expressed as the difference from the initial value (gloss value prior to testing).

TABLE 3

Resistance of the clear-coats to simulated environmental influences and to mechanical stress

|  | Example 2 | Example 3 | Example 4 (comparative) | Example 5 (comparative) |
|---|---|---|---|---|
| Acid resistance, first attack at [° C.] | 72 | 72 | 66 | 69 |
| Acid resistance, severe attack at [° C.] | 74 | 75 | 74 | 73 |
| Pancreatin resistance to [° C.] | >80 | >80 | 61 | 74 |
| Scratch resistance, Δ gloss 60° | 8 | 9 | 6 | 8 |
| Scratch resistance, Δ gloss 20° | 12 | 20 | 12 | 21 |

The results show that at a comparable proportion of aliphatic/cycloaliphatic polyisocyanate the resistances to mechanical stresses (scratch test), that result when using MPDI or HDI polyisocyanates as the aliphatic polyisocyanate component, are comparable. However, the use of polyisocyanate components based on MPDI polyisocyanate and on IPDI polyisocyanate (Examples 2 and 3) leads to significantly improved resistances to environmental influences.

Obviously, numerous modifications and variations of the present invention are possible in light of the above teachings. It is, therefore, to be understood that within the scope of the appended claims, the invention may be practiced otherwise than as specifically described herein.

What is claimed is:

1. A two-component polyurethane coating composition comprising:
    A) a polyol component, and
    B) a polyisocyanate component,
    wherein the polyisocyanate component (B) comprises at least 30% by weight of a polyisocyanate of 2-methylpentane-1,5-diisocyanate and a polyisocyanate of isophorone diisocyanate, the sum of the two polyisocyanates being 100% by weight.

2. The composition of claim 1, wherein said polyisocyanate of 2-methylpentane-1,5-diisocyanate having an average funtionality of 2.3–5 is selected from the group consisting of biuret polyisocyanate, an uretdione polyisocyanate, an isocyanurate-functional polyisocyanate, allophanate-modified biuret polyisocyanate, allophanate-modified uretdione polyisocyanate, allophanate-modified isocyanurate-functional polyisocyanate and mixtures thereof.

3. The composition of claim 1, wherein said polyisocyanate of isophorone diisocyanate having an average functionality of 2.3 to 4 is selected from the group consisting of isocyanurate-functional polyisocyanate, and allophanate-modified isocyanurate-functional polyisocyanate.

4. The composition of claim 1, wherein a polyisocyanate that contains at least one isocyanurate group is present.

5. The composition of claim 1, wherein a polyisocyanate having a residual monomer content of less than 0.5% by weight is present.

6. The composition of claim 1, wherein isocyanurate-based polyisocyanates obtained by catalytic trimerization of diisocyanate mixtures of 2-methylpentane-1,5-diisocyanate and isophorone diisocyanate are present.

7. The composition of claim 1, wherein said polyol component (A) is selected from the group consisting of a hydroxyl-containing (meth)acrylic acid ester copolymer, hydroxyl-containing saturated polyester resins, urethane and ester-functional polyols and mixtures thereof.

8. The composition of claim 1, wherein the mixing ratio of components (A) and (B), expressed as stoichiometric ratio of OH:NCO, is from 1:0.8 to 1:1 5.

9. The composition of claim 1, wherein a solvent is present.

10. The composition of claim 7, wherein said hydroxyl-containing (meth)acrylic acid ester copolymer having an acid number of 0 to 15 is prepared by using a hydroxyl-containing (meth)acrylic acid.

11. The composition of claim 7, wherein said hydroxyl-containing (meth)acrylic acid ester copolymer having an acid number of 3 to 10 is prepared by using a hydroxyl-containing (meth)acrylic acid.

12. The composition of claim 7, wherein said hydroxyl-containing (meth)acrylic acid ester copolymer has a weight average molecular weight of between 2,000 and 20,000.

13. The composition of claim 7, wherein said hydroxyl-containing (meth)acrylic acid ester copolymer has a glass transition temperature of −10 to +60° C.

14. The composition of claim 7, wherein said hydroxyl-containing (meth)acrylic acid ester copolymer having a hydroxyl number of 72 to 150 mg of KOH/g is prepared by using a hydroxyl-containing (meth)acrylic acid.

15. The composition of claim 7, wherein said hydroxyl-containing (meth)acrylic acid ester copolymer has a hydroxyl number of 90 to 190 mg of KOH/g.

16. The composition of claim 7, wherein said polyol is polyester polyol having a weight average molecular weight of from 500 to 5,000 and an average functionality of from 2.0 to 4.0.

17. The composition of claim 7, wherein said polyol is polyester polyol having a weight average molecular weight of from 800 to 3,000 and an average functionality of from 2.0 to 3.5.

18. The composition of claim 1, wherein an auxiliary is present.

19. The composition of claim 18, wherein said auxiliary is selected from the group consisting of stabilizers, catalysts, leveling agents, sag control agents, microgels, and pyrogenic silica.

* * * * *